(12) United States Patent
Edwards et al.

(10) Patent No.: US 8,489,068 B1
(45) Date of Patent: Jul. 16, 2013

(54) SYSTEM AND METHOD FOR COMPLETION OF ALL CALLS USING SINGLE CALL FUNDING OPTIONS

(75) Inventors: Adam Christopher Edwards, Fort Worth, TX (US); Patrick Walter Brolsma, McKinney, TX (US)

(73) Assignee: Securus Technologies, Inc., Dallas, TX (US)

( * ) Notice: Subject to any disclaimer, the term of this patent is extended or adjusted under 35 U.S.C. 154(b) by 547 days.

(21) Appl. No.: 12/766,159

(22) Filed: Apr. 23, 2010

(51) Int. Cl.
*H04M 11/00* (2006.01)
(52) U.S. Cl.
USPC ............... 455/406; 379/114.21; 379/114.23; 379/112.01; 379/114.01; 379/115.01
(58) Field of Classification Search
USPC .............. 455/406; 379/112.01–112.09, 114.01–114.29, 115.01–115.03, 121.01–121.06
See application file for complete search history.

(56) References Cited

U.S. PATENT DOCUMENTS

| | | | |
|---|---|---|---|
| 2003/0193961 A1* | 10/2003 | Moore et al. | 370/401 |
| 2007/0263812 A1* | 11/2007 | Polozola et al. | 379/144.02 |
| 2008/0220739 A1* | 9/2008 | Muoio et al. | 455/406 |

\* cited by examiner

*Primary Examiner* — Manpreet Matharu
(74) *Attorney, Agent, or Firm* — Fogarty, L.L.C.

(57) ABSTRACT

Embodiments of the invention provide systems and methods that identify requested call connections that cannot be billed by a call management system and redirects those calls to a call processing platform. The call management system sends data associated with the requested call connections to the call processing platform in a session initiation protocol (SIP) message header. The call processing platform identifies one or more payment options that are not available for use by the call management system and offers the called party the opportunity to accept one of the payment options to complete the requested call connection. The call processing platform connects the calling party and the called party and sends a call detail record with billing data to the call management system.

19 Claims, 4 Drawing Sheets

SYSTEM AND METHOD FOR COMPLETION OF ALL CALLS USING SINGLE CALL FUNDING OPTIONS

TECHNICAL FIELD

Embodiments of the invention are directed, in general, to billing processes for outbound calls and, more specifically, to providing multiple options for payment of a call.

BACKGROUND

In telephone systems used in controlled-environment facilities, such as a prison, jail, detention facility, or hospital, a resident or inmate is often unable to pay for outbound telephone calls due to insufficient funds or a lack of an account for the telephone system. Therefore, the resident's outbound calls must be charged to the called party, to a third party, or to an external account, such as a prepaid account. Many outbound calls from such facilities are not completed because funding for the call cannot be established by either the called party or the calling party. For example, calls may not be completed when the called number does not have sufficient funds, has reached its threshold of completed calls, the calling or called party does not have a prepaid account, the called party has a reached a credit limit, or if no billing arrangement is in place between the service provider hosting the calling party's telephone and the service provider hosting the called party's telephone.

It is estimated that as many as fifty percent of outbound calls from controlled-environment facilities are not completed for such reasons. Typically, these calls fail without any notice being provided to the called party regarding the call attempt and without offering alternative payment options to the called or calling parties. As a result, inmates tend to stay in jail longer without being able to make contact with their called party and significant revenue opportunities associated with the failed calls are lost.

SUMMARY OF THE INVENTION

Embodiments of the call routing system described herein identify non-billable calls and connects these non-billable calls to a called party or destination number. The call routing system offers the called party one or more options to pay for the call. The payment options include, for example, debit/credit cards, accepting the call as an SMS text message billed to a wireless telephone bill, or setting up and funding a prepaid or direct bill account. If the called party does not answer or is unable to accept the call, the marketing engine will place an outbound call and/or text message to the called party informing them that the calling party is trying to reach them and presenting options to create and/or fund a prepaid account A unique aspect of this system is that it identifies specific calls for which the calling party is unable to pay for the call and the call cannot otherwise be connected to the called party, such as when the called party is unable to accept collect calls. The system identifies these calls using codes that are routed through intelligent logic to determine the specific payment options available to the called party for accepting the call. The system configurations determine how the called party is notified of the call along with an offer to accept the call and an agreement to pay by accepting the call as a promotional SMS text message on their wireless phone bill, to pay with their credit or debit card, or to connect directly to a customer care center to create and/or fund a prepaid account.

The external billing system provides options for the called party to press a digit and get to customer care for purposes of creating or funding a prepaid account. When the called parties choose this option, the call will be routed to the customer care center where they will enter an IVR or live agent that allows the called party to setup a new account. The system walks the called party through creating and/or funding a prepaid account.

If a called party cannot or does not accept the call, the system places a separate call to the called party to notify them that the calling party is trying to get in touch with them. If the called party has opted into text messaging, the system will also send a text message to notify them of the calling party's attempt to reach them.

Another unique embodiment of the invention is that the called party is given an indication the calling party is trying to call them if the called party does not answer the call or if the call was not connected for some reason. This new process makes a call and/or sends a text message to the called party to notify them that an inmate is trying to reach them and provides options on how to receive calls from inmates in the future Additionally, embodiments of the invention are unique in that it allows the called party to pay for calls as they arrive, instead of forcing the called party to maintain a prepaid account to receive calls.

BRIEF DESCRIPTION OF THE DRAWINGS

Figure 1:
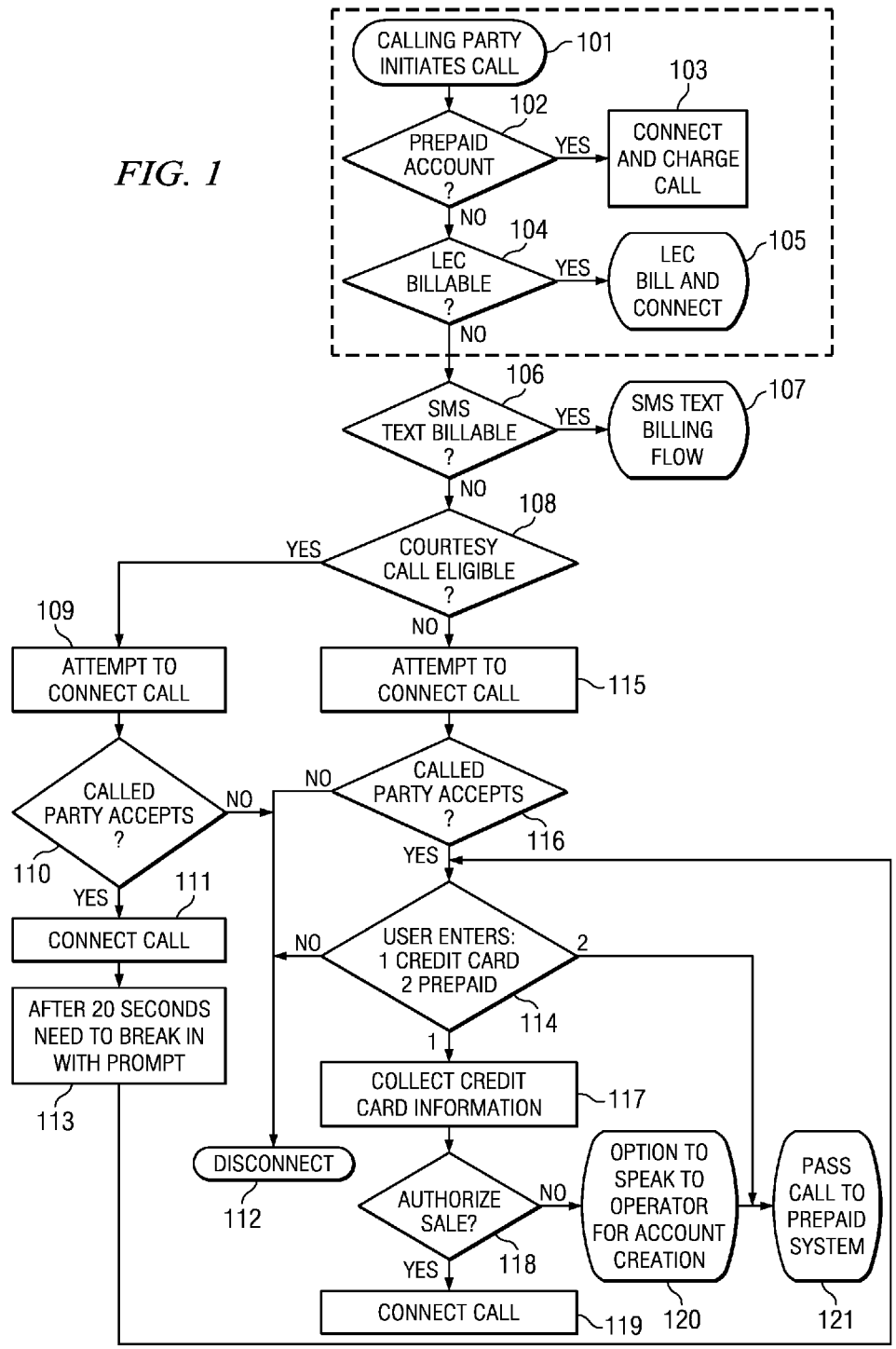
Figure 2:
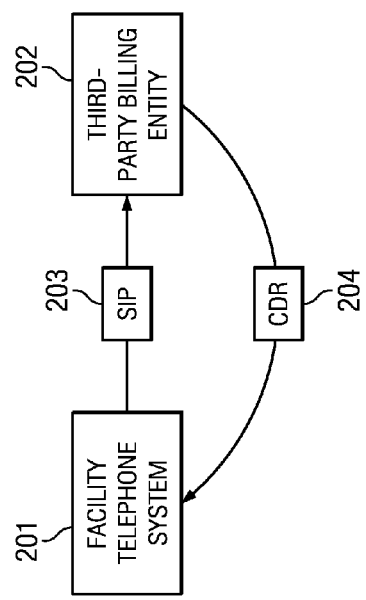
Figure 4:
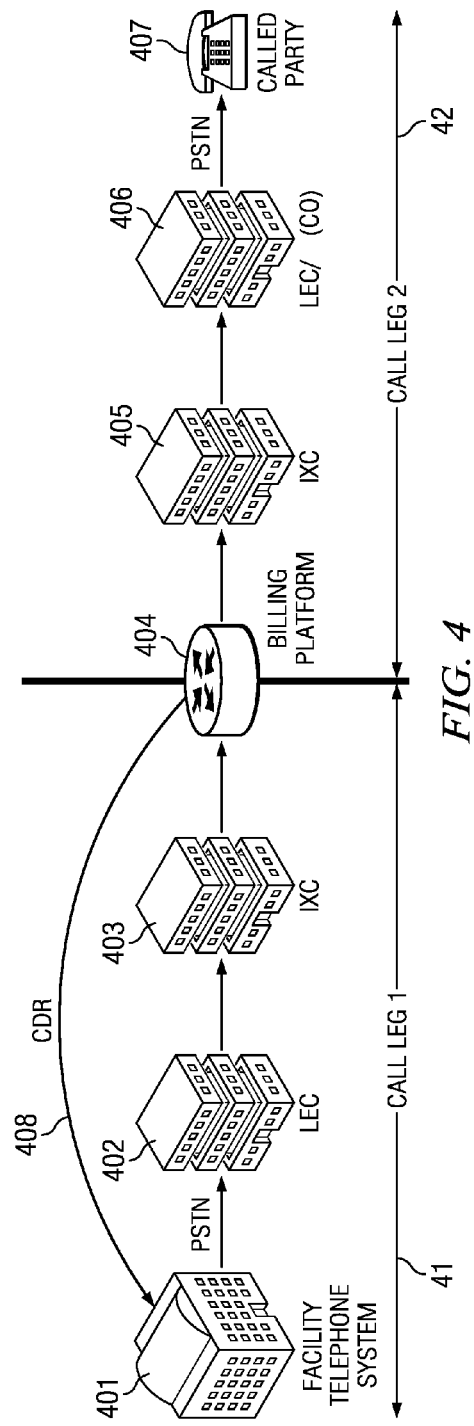
Figure 3:
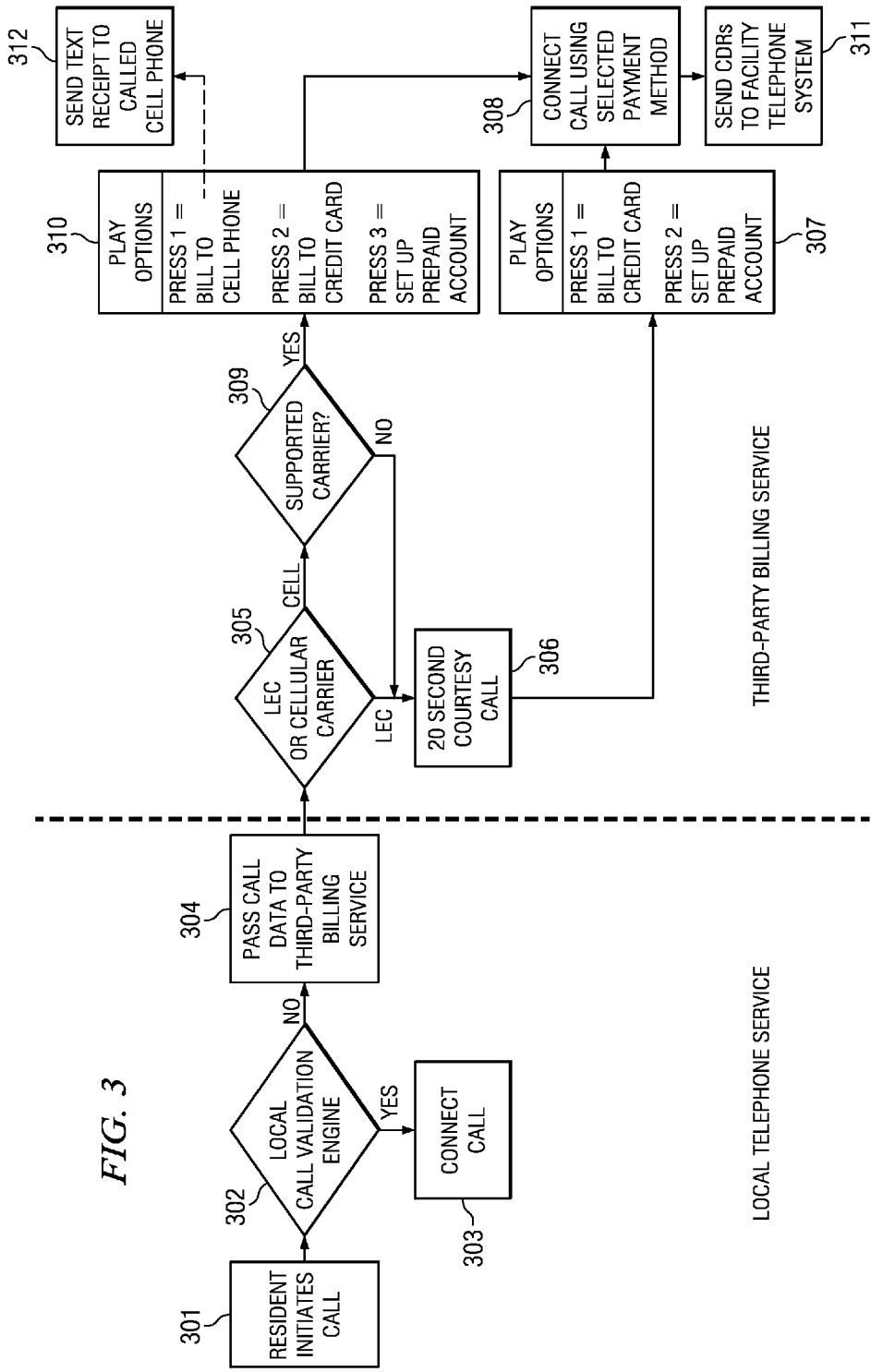
Figure 5:
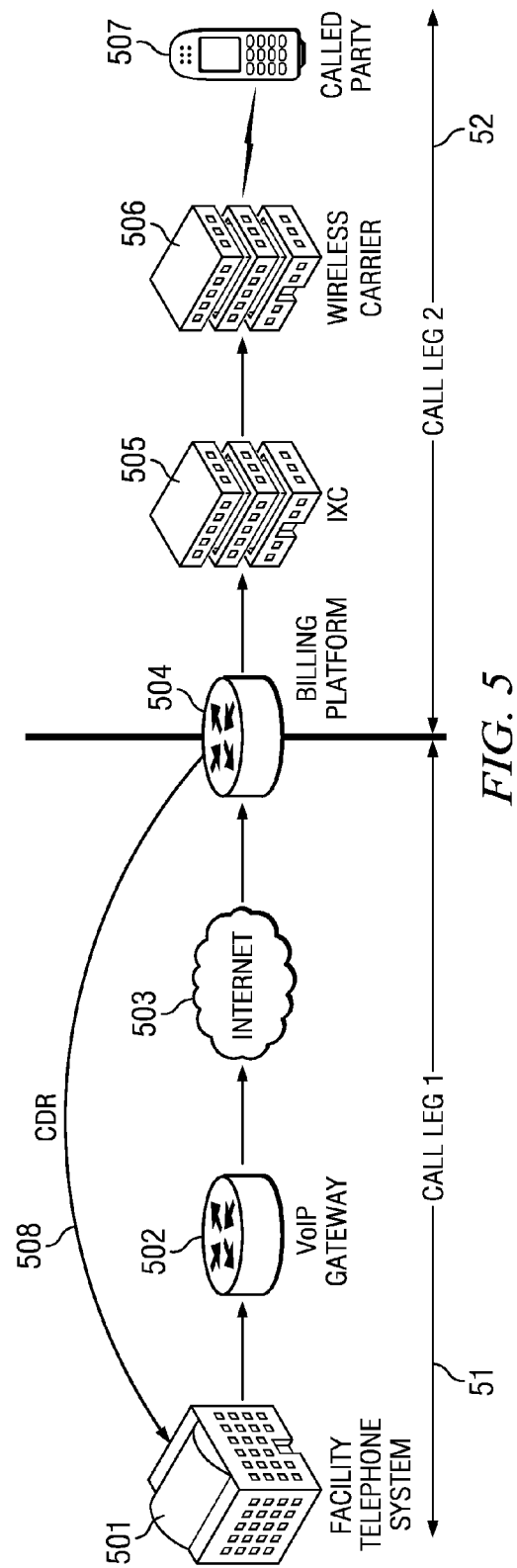

Having thus described the invention in general terms, reference will now be made to the accompanying drawings, which are not necessarily drawn to scale, and wherein:

FIG. 1 is a flowchart illustrating an exemplary embodiment of the invention;

FIG. 2 is a high-level block diagram illustrating the interaction between a telephone system at a controlled-environment facility and a third-party billing entity;

FIG. 3 is a flowchart illustrating an alternative embodiment of the invention;

FIG. 4 is a block diagram illustrating call routing using an exemplary embodiment of the invention; and FIG. 5 is a block diagram illustrating call routing using an alternative embodiment of the invention.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Embodiments of the invention provide called parties with notice of inbound call attempts and further provide multiple methods by which the called party can accept and pay for an inbound call. Embodiments of the invention identify information regarding the called number, such as the identity of the called party's service provider and the type of called device (e.g. a wireless or wireline device). This information is then used to determine specific options that are available for the call. These options may be selected based upon the service provider identity and/or based upon the payment methods that the called device is able to accept. For example, a residential telephone line may be able to accept payment options that are different than those acceptable at a wireless device. Collect calls and local exchange carrier (LEC) billing may be possible when the called number is a residential, wireline telephone, but not if the called number is associated with a wireless device. Alternatively, SMS text billing, which is described herein as "text collect," is typically unavailable to residential, wireline telephone.

A resident in a controlled-environment facility, such as a prison, jail, detention facility or hospital, may have an established facility account, such as a commissary account or telephone charge account. In such cases, the resident's calls are charged to his or her respective facility account and, therefore, outside parties, such as the called party, are not involved in paying for the calls. However, if the funds in the facility account are insufficient to pay for a call, or if the resident does not have a facility account, such as a new resident or a short term resident, then the resident must use an alternative method to pay for calls.

A well-known alternative to pay for calls is the use of a prepaid account or card. The prepaid account may be administered by the facility, by the telephone service provider, or by a third party. The resident indicates that payment should be deducted from the prepaid account when the call is initiated or when prompted for payment. If the resident does not have a prepaid account, then the telephone system may offer the resident the opportunity to open a new prepaid account. Alternatively, the telephone system may look to the called party to pay for the call.

If the resident is unable to pay for the call, then collect calling and reversing the call charges to the called party may be used to shift the cost of the call to the called party. However, if the service provider at the controlled-environment facility does not have a contractual billing relationship with the service provider or LEO for the called party, then collect calling may not be an option for the resident. In such cases, the telephone system may offer the called party the opportunity to pay for the call using some other method, such as by using a prepaid account or credit card belonging to the called party.

In some embodiments, as a courtesy, the call may be connected between the resident and the called party for a limited duration, such as for 20-40 seconds, for example, to provide the called party with notice of the resident's need for assistance to pay for the current call and/or for future calls. Such a system is described in U.S. Pat. No. 7,042,922, entitled "Systems and Methods for Account Establishment and Transaction Management Using Interrupt Messaging," the disclosure of which is hereby incorporated herein in its entirety. Following the courtesy connection, the called party may be prompted to pay for the call with their credit or debit card and/or open a prepaid account for the resident. If the called party elects to open such an account, then he or she may be routed to a customer service operator or an interactive voice recognition (IVR) system to establish the new account.

Additional payment options may be available when the called number is associated with a mobile device or cellular telephone. For example, mobile devices that are capable of receiving SMS text messages in addition to voice calls may accept the charges for an inbound voice call by accepting a promotional call followed by an SMS text message. As is known, a user may subscribe to, and be charged for, inbound text messages from commercial services. The charges for the text messages appear on the user's monthly invoice from the mobile device service provider. In embodiments of the present invention, the called party receives a voice or text message indicating that an inbound voice call is being attempted and that the call may be completed if the called party accepts the promotional call and SMS text message. Upon indicating acceptance of the promotional call and text message, the call is completed between the resident and the called party. The user also receives a text message that includes information regarding the inbound voice call, such as a cost of the call and text message and information (phone number and/or web site) for instructions to set up an account for future calls from the resident. The charge for the inbound promotional voice call is included in the charge for the text message and appears on the called party's monthly statement. This system is referred to herein as SMS text billing or as text collect.

Embodiments of the invention allow a service provider, such as the operator of the controlled-environment facility telephone system, to offer one or more of these options to the called or calling party. The invention identifies call information, such as the called and calling parties' identities, routes the call, and determines which unique payment options are available for that particular call. The available options may be determined by thresholds that are set for each option and that are triggered based upon the calling party, called party, initiating facility, how many calls the resident made that month, or the like.

In one embodiment, a resident initiates a new call, but the call is blocked when a payment method is not available. For example, the call may be blocked because the resident's commissary or prepaid accounts have insufficient funds, the resident lacks a prepaid account, the called number is assigned to mobile device, the called number is associated with a LEO that does not have a billing arrangement with the service provider, or for any other reason. The system identifies why the call has been blocked and assigns a block-specific code to the call. The call information and the blocking code are then passed to a logic engine that determines what payment, connection, or call flow options are available for the call.

Table 1 illustrates an exemplary list of options available for different calls from a particular facility or resident. Based upon the facility, resident and blocking code identified for a particular call, the present invention provides one or more options for the call. For example, call 1234 may be to a mobile device that can accept text messages, and call 5678 may be to a residential telephone. Accordingly, calls with code 1234 may be offered SMS text billing or text collect, while calls with code 5678 are not offered that option. The numbers listed in each column of Table 1 indicate how many times per month calls a particular facility, resident, or called party can use that billing option. In alternative embodiments, Table 1 may simply indicate if an option is available without limiting month use.

TABLE 1

| Blocking Code | Courtesy Call Connection | SMS Text Billing | Credit Card | Prepaid Account |
|---|---|---|---|---|
| 1234 | 1 @ 30 sec | 3 | 5 | Infinite |
| 5678 | 1 @ 30 sec | 0 | 10 | Infinite |
| ... | | | | |

In the illustrated example, calls assigned blocking code 1234 are provided a 30-second courtesy call connection once per month. As described above, the courtesy call connection may be followed by an offer to the called party to establish a prepaid account. The called party may accept the call and pay using SMS text billing three times per month, and the called party may accept the call and pay using a credit card five times per month. Calls may be charged to a prepaid account an unlimited number of times.

The call routing logic illustrated in Table 1 may be processed by the controlled-environment facility telephone system itself. Alternatively, a third party may provide this service for calls that the controlled-environment facility telephone system cannot process and bill.

FIG. 1 is a flowchart illustrating an exemplary embodiment of the invention. A calling party initiates an outbound call in step 101. The calling party may be, in one embodiment, a resident of a controlled-access facility, such as a prison inmate or hospital patient. The telephone system first determines whether the calling party is associated with a prepaid account, such as a prepaid telephone account or an inmate or patient commissary account. If a prepaid account is identified for the calling party's calls, then the process flows to step 103 where the call is connected to the called party and the prepaid account is billed for the costs associated with the call.

If the telephone system cannot identify a prepaid account for the calling party in step 102, then the process flows to step 104 where the telephone system evaluates whether the call is billable to a called party prepaid account or a Local Exchange Carrier (LEC). If the call is billable to a LEC, then the call is connected to the called party in step 105 and the costs for the call are billed through the LEC.

If the call cannot be billed to a LEC in step 104, then the process flows to step 106 where the telephone system evaluates whether the called number is associated with a mobile device and whether the call may be connected using SMS text billing. If the call is billable using SMS text billing, then the process flows to step 107, which initiates an SMS text billing call flow.

If the call cannot be billed using SMS text billing in step 106, then the process flows to step 108 where the telephone system evaluates whether the called number is eligible for a courtesy call connection service as described above. In such a case, the process flows to step 109 where the telephone system attempts to connect to the called party. A message may be played to the called party offering to connect the calling party for a short period of time at no charge. If the called party accepts the offered call in step 110, then the called and calling parties are connected at step 111. Otherwise, the call is disconnected and the process terminated at step 112.

If the call has been connected in step 111, then the parties are allowed to converse for a predetermined period, such as 20-50 seconds. After the expiration of the predetermined time, then the connection is interrupted at step 113 where a prompt is played to the called party offering to continue the call by accepting payment via a credit card or by establishing a prepaid account. The called party's response is received in step 114, if the called party declines the offer to pay by credit card or to open a prepaid account, then the call is disconnected in step 112.

Returning to step 108, if the called party is not eligible for a courtesy call connection, then the process flows to step 115. A called party may be ineligible for a courtesy call connection, for example, if he or she has already received a courtesy call that month. In step 115, the system attempts to connect to the called party by offering to complete the call if the called party will pay for the call. If the called party declines the call in step 116, then the call is disconnected in step 112. If the called party accepts the call at step 116, then the process continues to step 114

If the called party selects payment by credit card in step 114, then the process flows to step 117 where credit card information is collected and then to step 118 where the credit card charge is authorized. The call is connected at step 119, if the credit card charge is approved. If the credit card charge is declined at step 118, then the called party is offered the option to open a prepaid account to pay for the call at step 120.

If the called party elects to open a prepaid account at steps 114 or 120, then they are passed to a prepaid system in step 121. The prepaid system may be a live customer service operator or an IVR system that collects information to open a new prepaid account for the called party or to identify an existing prepaid account.

In one embodiment, all of the steps 101-121 are performed by the same entity. Alternatively, steps 101-105 are performed by a service provider associated with the controlled-environment facility and steps 106-121 are performed by a third-party billing entity. When a separate third-party entity is used, the service provider sends call information to the third-party entity, such as call routing information and a blocking code that indicates why the call was not completed in steps 102 or 104. The third-party billing entity then takes responsibility for completing and billing the call.

The billing entity may skip certain steps in FIG. 1 depending upon the initiating facility, calling party or called party. Referring to Table 1 above, for example, if the called party has already received a courtesy call from the calling party within the current month, then the billing entity may skip steps 108-113 and instead proceed directly to step 115 from step 106, if the call is not SMS text billable. The billing entity may also skip steps 106-107 and/or steps 117-120, if the called party has already used his or her allotment of SMS text billable or credit card billable calls for the month.

FIG. 2 is a high-level block diagram illustrating the interaction between the telephone system 201 at the controlled-environment facility and the third-party billing entity 202. In one embodiment, telephone system 201 has the capability to perform some but not all of the available billing processes. To take advantage of a broader range of billing methods and to encourage the completion of more calls, telephone system 201 passes certain outbound calls to third-party billing entity 202 when system 201 is unable to complete the call. The call is sent to third-party billing entity 202 with a Session Initiation Protocol (SIP) header 203 that includes call data, such as a facility or site identifier, blocking code, calling party identification, and called number information. The third-party billing entity uses the data in SIP header 203 to determine what payment methods are available for the call and to complete the call to the called party.

Once the called party accepts or declines the inbound call, the third-party billing entity 202 sends a call detail record (CDR) 204 back to telephone system 201. CDR 204 identifies whether the call was accepted or denied and the amount charged for the call. Other information may be included in CDR 204, such as the duration of the call, the rate applied to the call, and the type of payment method that was used, such as a prepaid account, credit card, SMS text billing, or courtesy call connection. In an alternative embodiment, CDR 204 may include a daily update comprising data for multiple calls processed by third-party billing entity 202.

Third-party billing entity 202 maintains data that indicates how each call should be processed when received from telephone system 201, such as illustrated in Table 1. SIP header 203 includes a code or other identifier that corresponds to an entry in Table 1. Table 2 illustrates an alternative embodiment of the call-processing instructions maintained in the third-party billing entity 202. Instead of sending a blocking code, an entry point is included in SIP header 203. Third-party billing entity 202 uses the entry point to determine what payment methods are available for each call.

TABLE 2

| Entry Point | Customer Service | Credit Card | Courtesy Call Connection | SMS Text Billing |
|---|---|---|---|---|
| 1 | X | | X | |
| 2 | | X | | |
| 3 | X | X | X | X |
| 4 | X | X | X | |
| 5 | X | | | X |
| 6 | | X | | X |

The third-party billing entity 202 offers one or more of the listed connection options to the called party. The customer service option allows the called party to speak with a customer service operator to establish and fund a prepaid or other account. The credit card option allows the called party to charge the call to a credit card. The courtesy call connection option allows the called party to speak to the calling party or resident for a short period, such as 20-50 seconds, for free. If the called party is using a mobile device, the SMS text billing option allows the called party to pay for the call by accepting a premium text message. Based upon the designated entry point, the third-party billing entity presents the available options to the called party.

FIG. 3 is a flowchart illustrating an alternative embodiment of the invention. A resident initiates a call at step 301 using a local telephone system in the controlled-environment facility. The call is processed by a local call validation engine in the local telephone system at step 302. The local call validation engine determines whether the call can be billed and connected by the local telephone system. If the call can be billed, then it is connected in step 303. Some calls may not be billable from the local telephone system, such as calls initiated by residents with insufficient funds, calls to parties with bad debt ratings, and calls to carriers or LECs lacking a billing relationship with the local telephone system. These unbillable calls are passed to a third-party billing service at step 304.

The third-party billing service determines whether the call is directed to a cellular carrier or a LEO in step 305. If the call is directed to a LEO, then the resident and called party are connected for a twenty-second courtesy call in step 306. This short-duration call is sufficient to provide notice to the called party that the resident is attempting to contact them. After disconnecting the twenty-second courtesy call, the third-party billing system then presents the called party with a list of options to continue the call. For example, in step 307, the called party is notified of the opportunity to pay for the call using a credit card or a prepaid account. In step 308, the parties are connected and the call is billed using the payment method selected by the called party in step 307.

If the third-party billing service determines that the called number is associated with a cellular carrier in step 305, then, in step 309, it further evaluates whether the cellular carrier supports wireless billing methods, such as SMS text billing. If the cellular carrier is not supported, then the process moves to step 306 and the call is treated like a LEO call for billing purposes. If the cellular carrier does support wireless billing methods, then the third-party billing system then presents the called party with an alternative list of options to continue the call. For example, in step 310, the called party is notified of the opportunity to pay for the call using SMS text billing, a credit card or a prepaid account. In step 308, the parties are connected and the call is billed using the payment method selected by the called party in step 310.

After the call has been connected and/or completed, the third-party billing service sends CDR data to the local telephone system in step 311. The CDR data allows the local telephone system to reconcile charges for the calls passed to the third-party billing service.

Additionally, for calls to a mobile device that elect to pay for the call using SMS text billing, a text message is sent to the mobile device in step 312. The text message may be a receipt that lists the amount or rate charged for the call. The text message may further provide a telephone number or instructions that the called party can use to establish a prepaid account to pay for future calls to/from the local exchange.

FIG. 4 is a block diagram illustrating call routing using an exemplary embodiment of the invention. A calling party initiates a call from a telephone system at facility 401 to a called party at wireline telephone 407. The initiating 401 and destination 402 devices are circuit-switched telephones connected to the public switched telephone network (PSTN). Telephone system 401 determines that it is unable to adequately bill the call and, therefore, unable to connect the calling and called parties directly. Instead, the telephone system 401 determines that the call should be routed through a third-party billing service 404. The call is routed in two legs 41, 42.

Billing platform 404 receives the first call leg 41 from telephone system 401 via LEO 402 and Interexchange Carrier (IXC) 403. Billing platform 404 then performs a billing eligibility lookup on the destination number. If the destination number is billable, then the billing platform 404 initiates the second call leg 42 to called device 407. The second leg 42 is routed through IXC 405 and LEO central office (CO) 406. If the called party at the destination number 407 answers the call and accepts an offered payment option, such as a credit card payment, then the two call legs 41, 42 are bridged together for the allotted call time. During or after the call, billing platform 404 sends CDR 408 to telephone system 401. CDR 408 includes billing data, such as the payment method accepted by called party 407, the rate applied to the call, and/or the duration of the call.

FIG. 5 is a block diagram illustrating call routing using an alternative embodiment of the invention. A calling party initiates a call from a telephone system at facility 501 to a called party at wireless device 507. The initiating system 501 is a packet-switched telephone system using Voice over Internet Protocol (VoIP). Telephone system 501 determines that it is unable to adequately bill the call and, therefore, unable to connect the calling and called parties directly. Instead, the telephone system 501 determines that the call should be routed through a third-party billing service 504. The call is routed in two legs 51, 52.

Billing platform 504 receives the first call leg 51 from telephone system 501 via VoIP Gateway 502 and Internet 503. Billing platform 504 then performs a billing eligibility lookup on the destination number. If the destination number is billable, then the billing platform 504 initiates the second call leg 52 to called device 507. The second leg 52 is routed through IXC 505 and wireless carrier network 506. If the called party at the destination number 507 answers the call and accepts an offered payment option, such as an SMS text billing method, then the two call legs 51, 52 are bridged together for the allotted call time. During or after the call, billing platform 504 sends CDR 508 to telephone system 501. CDR 508 includes billing data, such as the payment method accepted by called party 507, the rate applied to the call, and/or the duration of the call.

It will be understood that the embodiments illustrated in FIGS. 4 and 5 are not intended to limit the call routing methods available for use with the present invention. In other embodiments, for example, a billing platform may bridge a circuit-switched first leg, such as leg 41, with a wireless carrier second leg, such as leg 52. Alternatively, the billing platform may also bridge a packet-switched/VoIP first leg, such as leg 51, with a circuit-switched second leg, such as leg 42.

In one embodiment, the controlled-environment facility is a prison and the residents are inmates. The inmates place telephone calls to friends, family and others using a call management system in the prison. An external billing service separate from the prison call management system processes calls to destination numbers associated with wireless phones. Calls to wireless devices are routed through the external billing system, which allows the called party to accept the call on their wireless device even if the prison call management system is unable to handle those calls directly. Called parties accept the call at a one-time charge for the entire duration of the call. After the call has ended, a text message is sent to the wireless device to give the called party information about the charges and about creating a prepaid account with the prison call management system. Wireless carriers must agree to participate in the program in order for their customers to receive calls from inmates on their wireless devices.

The present invention routes additional non-billable calls to the external billing service. This may include calls to landline and LEC customers as well as wireless customers. The called party is informed about options to pay for the call using their mobile phone bill, or to pay for the call using a credit card, or to connect to customer care center to set up a prepaid account.

Calls routed to the external billing service allows for the processing of a number of calls that were previously blocked for various reasons. For example, a call blocked by the prison's call management system because the called party does not have a balance on a prepaid account can be routed to the external billing system to provide the caller an option to either fund their account or pay for the call with a credit card. A benefit of the external billing service is the capability to route all calls even if they are non-billable at the prison's call management system.

The prison call management system routes non-billable calls to the external billing service at a single SIP address. The external billing service has a customer lookup table containing instructions to route the call using information about the non-billable call that is contained in a SIP Header. The SIP Header information may include, for example, a validation response code and a validation block reason, which indicate the reason that the call in not billable. The SIP Header may include other inmate- and call-related data as needed to route and bill the call.

Examples of the validation response codes and SIP Header information include:
  Carrier Block
  High Toll Block
  High Velocity Block
  Over The Limit
  No Bill Account Found
  Prepay Account Never Funded
  Unbillable Block
  LEC Write-off
  Collect Call Restriction
  No Customer Record Found
  Cell Phone
  Payphone
  Cellular Exchange
  LEC Block
  Bad Debt
  Bad Billing Name and Address
  Prepay balance less than $2
  Minimum Funds
  Network Error The prison call management system receives a positive acceptance via a SIP information message or CDR from the external billing system when the called party accepts the call. The call may then be updated in the prison's call management system as complete and/or as being positively accepted by the called party. Calls that are not accepted are shown as incomplete. The CDR may also indicate the duration of the call. Call duration timers start at the time of acceptance of the called party—not when the call hits the external billing service. The CDR shall also indicate how the call was accepted, such as by SMS text billing, credit card, or prepaid option. The prison call management system may use the acceptance method as the call type for a completed call.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method, comprising:
  receiving a call connection request from a call management system, the call connection request identifying a calling party and a called party and including a billing-status code, the billing-status code indicating a reason why the call management system cannot complete a call connection between the calling party and the called party;
  offering the called party at least one billing option to accept the call connection, the at least one billing option not available for use by the call management system, the at least one billing option presented to the called party via a text message, the text message indicating that an inbound voice call is being attempted and that the voice call may be completed if the called party indicates acceptance of the text message;
  completing the call connection between the calling party and the called party upon the indication of acceptance of the text message by the called party; and
  sending the call management system a message including billing data for the completed call connection.

2. The method of claim 1, further comprising:
  identifying a carrier for the called party; and
  determining the at least one billing option based upon the identified carrier.

3. The method of claim 1, further comprising:
  prior to offering the called party the at least one billing option, determining that a maximum number of attempts to use the at least one billing option has not been exceeded, the maximum number of attempts corresponding to the billing-status code.

4. The method of claim 1, further comprising:
  identifying the at least one billing option among a plurality of other billing options based upon the billing-status code.

5. The method of claim 1, further comprising:
  performing a database look-up using the billing-status code to determine the at least one billing option.

6. The method of claim 1, wherein the at least one billing option is selected from the group consisting of:
  SMS text billing;
  credit card billing; and
  prepaid account.

7. The method of claim 6, wherein prior to offering the called party one or more of the at least one billing option to accept the call connection, the calling party and called party are connected for a short-term courtesy call.

8. The method of claim 1, wherein the call management system is a telephone system serving a detention facility, and wherein the calling party is an inmate at the detention facility.

9. A method, comprising:
   establishing a first leg of a call connection between a calling party and a call processing service, the calling party using a call management system that is unable to bill for a requested call connection between the calling party and a called party;
   sending a session initiation protocol (SIP) message from the call management system to the billing service, the SIP message comprising a header with information associated with the requested call connection, the SIP message header comprising information identifying a billing code for the requested call connection, the billing code associated with a reason that the requested call connection is not billable by the call management system;
   offering, by the call processing service to the called party, one or more payment options for the requested call connection, wherein the payment options are not available for use by the call management system, the one or more payment options identified based upon the billing code;
   receiving an acceptance of a payment option from the called party;
   establishing a second leg of the call connection between the call processing service and the called party;
   bridging the first leg and the second leg to create a completed call connection; and
   sending a call detail record for the completed call connection from the call processing service to the call management system.

10. The method of claim 9, wherein one or more payment options are presented to the called party via a text message, the text message indicating that an inbound voice call is being attempted and that the voice call may be completed if the called party indicates acceptance of the text message.

11. The method of claim 9, further comprising:
    prior to offering the called party the one or more payment options, determining that a maximum usage of the one or more payment options has not been exceeded, the maximum usage corresponding to the billing code.

12. The method of claim 11, wherein the maximum usage is particular to the called party.

13. The method of claim 12, wherein maximum usage is particular to the calling party.

14. The method of claim 9, wherein the call detail record comprises billing data for the completed call connection.

15. The method of claim 9, further comprising:
    connecting the calling party and the called party for a short-term courtesy call prior to offering the called party the one or more payment options for the requested call connection.

16. A call processing platform, comprising:
    an interface to a call management system serving calling parties;
    an interface to one or more service providers serving called parties;
    an interactive voice response (IVR) system adapted to interact with the called parties to present one or more payment options to the called parties, wherein the payment options are not available for use by the call management system;
    a processor adapted to receive session initiation protocol (SIP) messages comprising information associated with requested call connections between calling parties and called parties, the SIP messages further comprising a code identifying why requested call connections cannot be completed by the call management system, the processor further adapted to identify at least one payment option available to called parties to pay for the requested call connections, the at least one payment option corresponding to the code.

17. The call processing platform of claim 16, wherein the processor is further adapted to, prior to offering the called party the at least one billing option, determine that a maximum number of attempts to use the at least one payment option has not been exceeded, the maximum number of attempts corresponding to the code.

18. The call processing platform of claim 16, wherein the calling parties and respective called parties are connected for a short-duration call prior to connecting the called parties to the IVR system.

19. The call processing platform of claim 16, wherein said payment options are selected from the group consisting of:
    SMS text billing;
    credit card billing; and
    prepaid account.

* * * * *